(No Model.) 3 Sheets—Sheet 2.
J. A. STOUT.
TRACTION ENGINE.
No. 491,385. Patented Feb. 7, 1893.
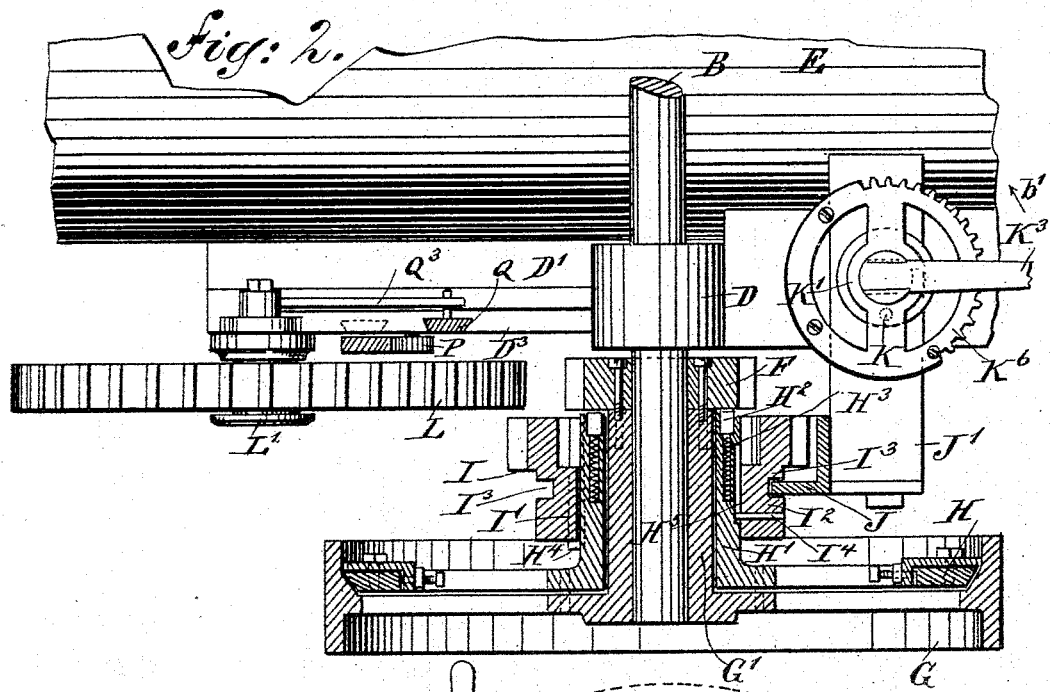
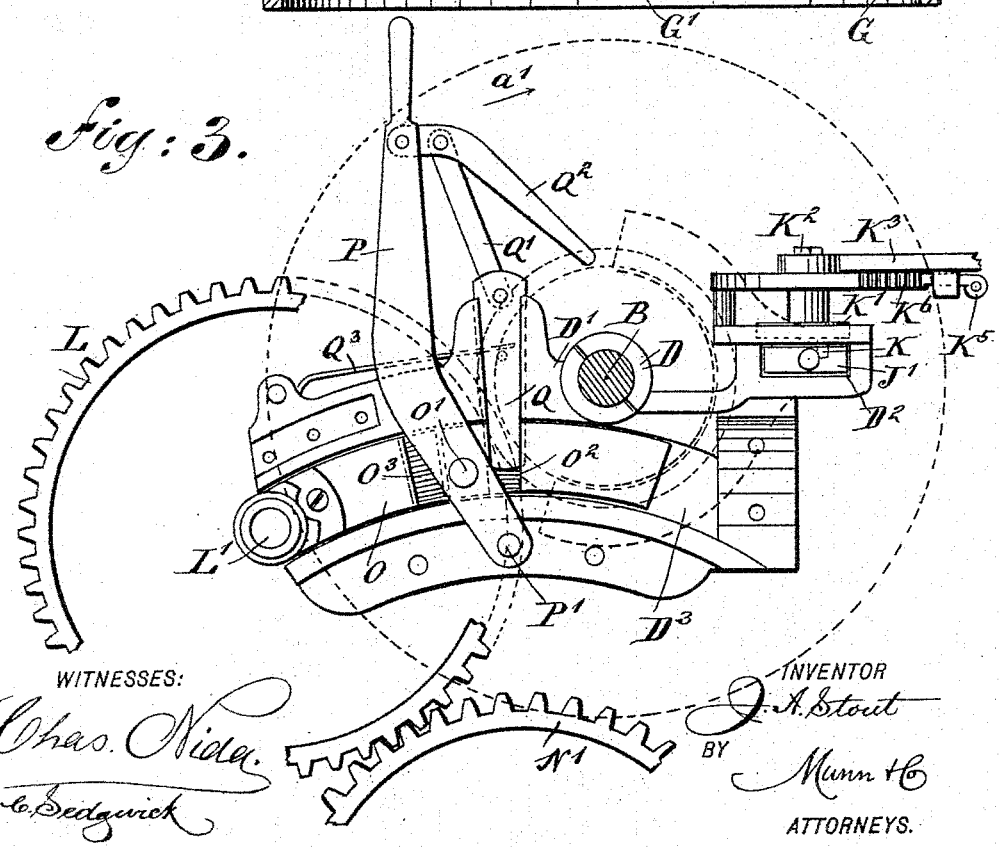
WITNESSES: INVENTOR
BY
ATTORNEYS.

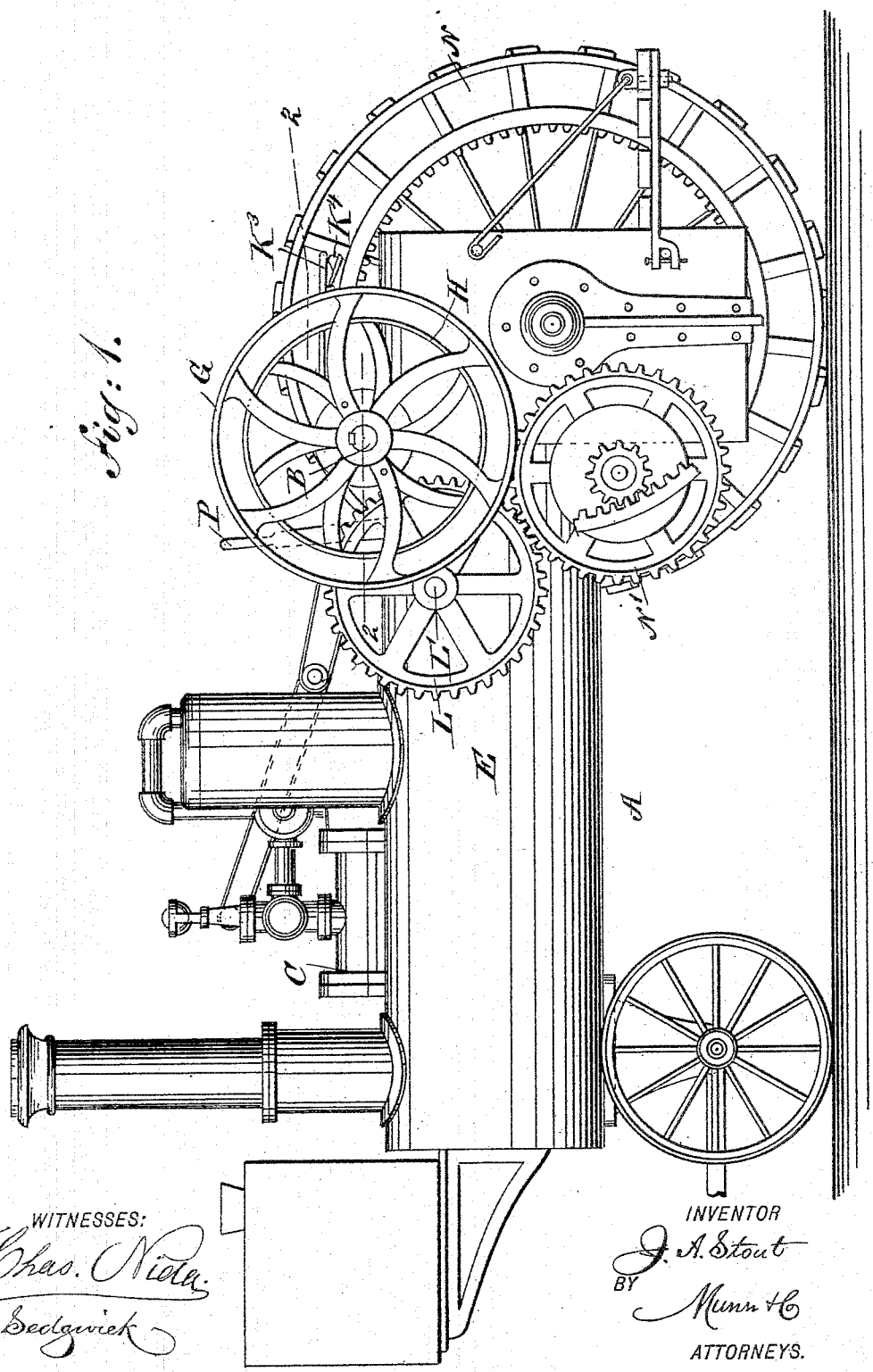

(No Model.) 3 Sheets—Sheet 3.
J. A. STOUT.
TRACTION ENGINE.
No. 491,385. Patented Feb. 7, 1893.
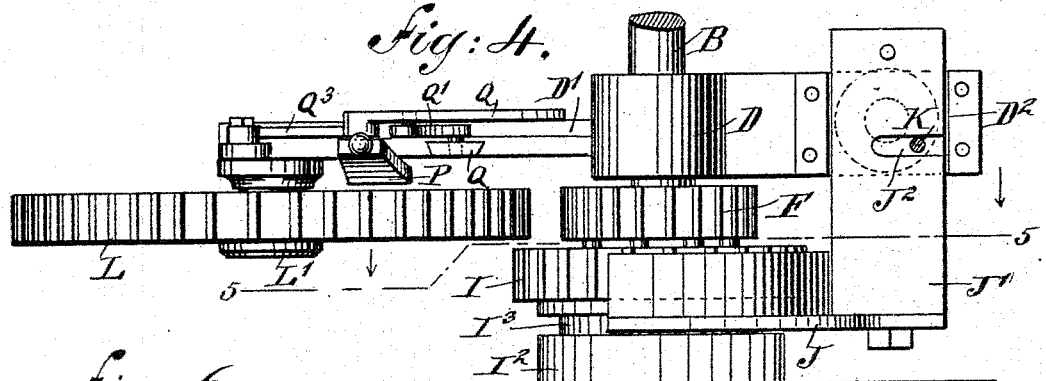
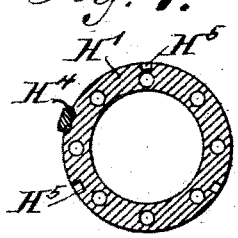
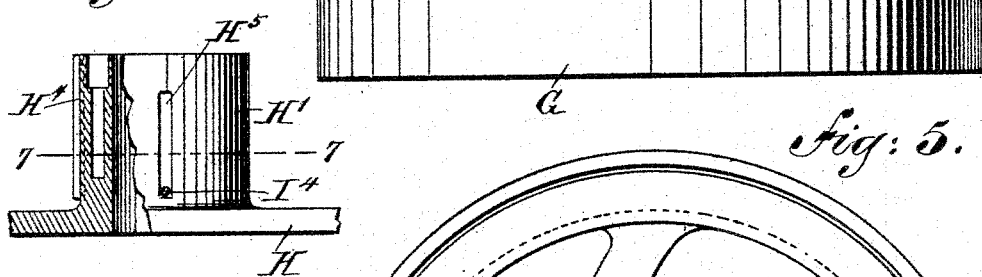
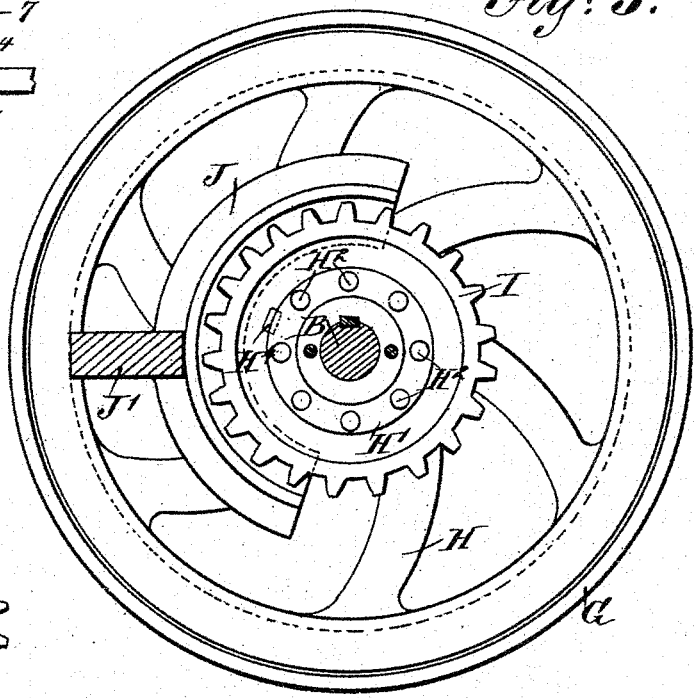
WITNESSES:
Chas. Nida
C. Sedgwick
INVENTOR
J. A. Stout
BY Munn & Co
ATTORNEYS.

UNITED STATES PATENT OFFICE.

JAMES A. STOUT, OF BELLEVILLE, ILLINOIS, ASSIGNOR TO THE HARRISON MACHINE WORKS, OF SAME PLACE.

TRACTION-ENGINE.

SPECIFICATION forming part of Letters Patent No. 491,385, dated February 7, 1893.

Application filed October 18, 1892. Serial No. 449,292. (No model.)

*To all whom it may concern:*

Be it known that I, JAMES A. STOUT, of Belleville, in the county of St. Clair and State of Illinois, have invented new and useful Improvements in Traction-Engines, of which the following is a full, clear, and exact description.

The object of the invention is to provide certain new and useful improvements in traction engines, whereby the machine can be propelled at a high or low rate of speed, and readily changed by the engineer from one speed to the other, without removing or rearranging any of the parts, the low speed permitting or moving the engine a short or minimum distance for tightening the driving belt or for other purposes.

A further object of the invention is to prevent over-heating of the journals of the driving shaft.

The invention consists principally of two differential driving pinions adapted to mesh with the traction gearing, and the larger pinion being recessed to fit over and inclose the smaller pinion.

The invention further consists of a gear wheel for the traction gearing and adapted to be shifted in the arc of a circle to move it in gear with a pinion on the driving shaft, or adapted to be engaged by the second driving pinion, at the same time remaining in gear with the traction gearing.

The invention further consists of a belt pulley secured on the driving shaft, and a friction pulley adapted to engage the rim of the belt pulley and pressed on by springs, in line with the driving shaft, to relieve the bearings of the latter of any side strain, to prevent over-heating of the bearings.

The invention further consists of a gear wheel mounted to slide on and to turn with the friction pulley pressed on by springs to make frictional contact with the belt pulley, and a shifting mechanism for imparting a sliding motion to the said gear wheel and for releasing the said friction pulley from the belt pulley.

The invention also consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1 is a side elevation of the improvement as applied; Fig. 2 is an enlarged sectional plan view of the improvement on the line 2—2 of Fig. 1; Fig. 3 is a side elevation of the same with parts removed and parts broken out; Fig. 4 is a plan view of the same; Fig. 5 is a sectional rear view of part of the improvement on the line 5—5 of Fig. 4; Fig. 6 is a plan view with parts in section of the friction pulley; Fig. 7 is a sectional face view of the hub of the same on the line 7—7 of Fig. 6; and Fig. 8 is a face view of the small driving pinion.

On the traction engine A is arranged the transversely extending main driving shaft B receiving a revolving motion from the engine C in the usual manner. The driving shaft B is mounted to turn in bearings D secured or formed on the pillow blocks D' bolted to the boiler E of the traction engine A. On the main driving shaft B, outside of each bearing D, is arranged a small driving pinion F bolted or otherwise secured to the hub G' of the belt pulley G, keyed or otherwise fastened with the said pinion F on the main driving shaft B.

On the inner surface of the rim of the belt pulley G acts a friction pulley H of the usual construction, at its rim, and provided with a hub H' mounted to turn loosely on the hub G' of the belt pulley G, the inner end of the said hub being provided with longitudinally-extending recesses, preferably arranged in a circle, as illustrated in Fig. 7, and each containing a block $H^2$ pressed outwardly by a coiled spring $H^3$ held in the recess. The outer ends of the blocks $H^2$ abut on the front face of the pinion F, so that the springs $H^3$ have the tendency to move the friction pulley H outward in frictional contact with the inner surface of the rim of the belt pulley G.

On the outside of the hub H' of the friction pulley H is secured a longitudinally-extending key $H^4$ engaging a key-way I' formed in the hub $I^2$ of the second driving pinion I, larger in diameter than the driving pulley F, but having teeth of the same pitch as the latter. This second driving pinion I is mounted to slide longitudinally on the hub H' with which it turns, owing to the key $H^4$ engaging the key-way I'.

In order to impart a longitudinal sliding motion to the second driving pinion I, I provide the hub $I^2$ of the latter with an annular groove $I^3$ engaged by a shifting segment J bolted or otherwise fastened on a transversely-extending bar J' mounted to slide transversely in suitable guideways $D^2$ arranged on the pillow blocks D'; see Figs. 3 and 4. In this bar J' is arranged a longitudinally-extending slot $J^2$ engaged by the wrist pin K of a crank disk K', held on a shaft $K^2$ disposed vertically and carrying a handle $K^3$, under the control of the operator, for turning the said shaft $K^2$, so as to cause the wrist pin K to impart a lateral sliding motion to the bar J' and consequently to the shifting segment J, so that the latter moves the second driving pinion I on the hub H' of the friction pulley H.

On the outer end of the handle $K^3$ is arranged a hand lever $K^4$, connected with a sliding bolt $K^5$ fitted to slide on the under side of the handle $K^3$ and adapted to engage a toothed segment $K^6$ supported on the guideways $D^2$. The bolt $K^5$ serves to lock the shifting mechanism in place in whatever position it may be in. The driving pinion F is adapted to be engaged by a gear wheel L in mesh with a gear wheel N' which, as well as the gear wheel L, forms part of the gearing for the traction mechanism. As the latter, with the exception of the gear wheel, is of the usual construction, no further description of the same is deemed necessary.

The gear wheel L is arranged in alignment with the first small driving pinion F but is adapted to be engaged by the second larger driving pinion I, when the latter is shifted transversely, as will be readily understood by reference to Fig. 2. The gear wheel L, to accomplish this double purpose, is mounted on a stud L', held on a bearing O mounted to slide in a segmental guideway $D^3$ formed or secured on a pillow block D'; see Fig. 3.

A pin O' on the bearing O is connected with a lever P extending upwardly, and fulcrumed at its lower end at P' to the pillow block D'. Now, by moving this lever P the bearing O can be shifted in its segmental guideway $D^3$, so that the gear wheel L is moved in or out of mesh with the first small driving pinion F. When the gear wheel L is, however, in the position shown in Figs. 2 and 3, the gear wheel is out of mesh with the driving pinion F, but is in such a position as to permit of throwing the second larger driving pinion I into mesh with it, when shifting the said second driving pinion inward by the shifting mechanism above described. In order to obtain the two normal positions of the gear wheel L, I provide the bearing O with two slots or recesses $O^2$ and $O^3$ adapted to be engaged by a bolt Q mounted to slide in suitable bearings in the pillow block D' above the guideway $D^3$, as will readily be understood by reference to Fig. 3. The upper end of the bolt Q is pivotally connected by a link Q' with a hand lever $Q^2$ fulcrumed near the upper end of the lever P. By moving the hand lever P upward, the bolt Q can be readily withdrawn from the respective recess $O^2$ or $O^3$, so as to shift the bearing O in the guideway $D^3$ by actuating the lever P.

When the gear wheel L is in its outermost position, as illustrated in Figs. 2 and 3, the bolt Q is engaged with the recess $O^2$ so as to lock the bearing O in this position, thereby holding the gear wheel L in its normal outermost position for engaging with the second large driving pinion I. When the bolt Q is withdrawn from the recess $O^2$, and the lever P is thrown rearward, in the direction of the arrow a', then the bearing O is shifted in the same direction, so that the gear wheel L moves in mesh with the small driving pinion F. As soon as this position is reached, the bolt Q registers with the recess $O^3$ and passes into the same by the action of a spring $Q^3$ pressing on the said bolt. The bearing O is then locked in its innermost position, thereby holding the gear wheel L in mesh with the pinion F.

The operation is as follows: When it is desired to travel at a high rate of speed, the operator moves the gear wheel L into an outermost position as shown in Figs. 2 and 3, and then moves the lever $K^3$ after unlocking the bolt $K^5$, in the direction of the arrow b', so that the large pinion I is moved in mesh with the gear wheel L. The rotary motion of the shaft B is now transmitted by the belt pulley G to the friction pulley H, and as the latter is connected by the key $H^4$ with the pinion I, the latter is rotated, and rotates the gear wheel L of the traction gearing N, so that the latter propels the engine forward at a high rate of speed. Now, when it is desired to stop the engine suddenly for any cause whatever, the engineer in charge moves the lever $K^3$ still farther in the direction of the arrow b', so that the stop pins $I^4$ in the pinion I, by pressing on the end wall of the recesses $H^5$, cause a lateral sliding of the hub H' of the friction pulley H, so that the latter is thrown out of frictional contact with the inner surface of the belt pulley G. As soon as the friction pulley H is disconnected no further rotary motion is imparted to the traction gear, and the traction gear will come to a standstill while the engine will continue in motion. When it is desired to again proceed on the journey, the operator moves the lever $K^3$ slightly back in the inverse direction of the arrow b', so that the stop pins $I^4$ release the hub H', and the latter and its pulley H are forced outward by the action of the springs $H^3$ on the blocks $H^2$, abutting on the outer face of the first driving pinion F. In case of accident the friction pulley H can be bolted to the web of the belt pulley to cause the pulleys to rotate together. In practice I provide registering bolt holes in the spider of the friction pulley, and the web of the belt pulley, to conveniently slip in bolts to fasten the pulleys together if necessary. The belt pulley G now transmits its motion to the pulley H, and the latter to the pinion I in mesh with the gear wheel L. Now, when it is desired to make use of the utmost power of the engine when going up steep hills or through muddy places, the pinion I is moved out of contact with the gear wheel L by the shifting mechanism above described, after which the operator moves the lever P in the direction of the arrow $a'$, the bolt Q having been previously withdrawn from the recess $O^2$. The gear wheel L is thus shifted to move in mesh with the small first driving pinion F, the gear wheel being locked in place by the bolt Q engaging the other notch $O^3$ as above described. The rotary motion of the shaft B is now directly transmitted by the pinion F to the gear wheel L, which latter now rotates at a low rate of speed, but with increased power, to readily pull the engine over a steep hill or through a muddy place.

It is understood that the gear wheel L does not move out of mesh with the gear wheel $N'$ of the traction gearing, when the lever P shifts the bearing O, as the guideway $D^3$ for the said bearing O is segmental, the center being in the center of the gear wheel $N'$.

It will be seen that by the construction shown and described, the friction pulley H in its normal position is always in contact with the belt pulley G, so that the latter always rotates the said pulley unless the latter is disengaged from the belt pulley, in case a sudden stop of the traction gearing is desired, as above described. It will further be seen that the friction pulley H is pressed into frictional contact with the belt pulley G by the action of the springs $H^3$ on the blocks $H^2$ abutting on the pinion F, the pressure of the said springs being in line with the driving shaft B, so that no side strain is on the said shaft and on the bearings D, to prevent over-heating of the latter.

When the engine is used as a power for thrashing machines for instance, and the gear wheel L is in mesh with the pinion F, the belt connecting the pulley G with the pulley of the thrashing machine, can be readily tightened or loosened by running the traction engine a short distance forward or backward at a slow speed.

Having thus fully described my invention I claim as new, and desire to secure by Letters Patent:—

1. A traction engine provided with differential driving pulleys adapted to connect with the traction gearing to impart either a slow or a high speed to the engine the larger pinion being recessed to fit over and inclose the smaller pinion, substantially as shown and described.

2. The combination in a traction engine with the drive shaft provided with a belt pulley carrying a small pinion, a friction pulley mounted on the hub of the belt pulley and adapted to be rotated from said belt pulley, and a recessed pinion keyed to the hub of the friction pulley to rotate therewith and slide toward said small pinion and inclose it, of a gear wheel forming part of the traction gearing lying in the plane of the small pinion and movable on the arc of a circle into mesh with either of said two pinions, substantially as set forth.

3. A traction engine provided with differential driving pinions actuated from the main driving shaft, and a gear wheel for the traction gearing and adapted to be shifted in the arc of a circle to move it in gear with the smaller of the said driving pinions, or to retain the said gear wheel in an outermost position to permit of moving the larger driving pinion in gear with it, substantially as shown and described.

4. A traction engine provided with a belt pulley secured on the driving shaft, and a friction pulley adapted to engage the said belt pulley and pressed on by springs in line with the driving shaft to relieve the bearings of the latter of any side strain, to prevent over-heating, substantially as shown and described.

5. In a traction engine, the combination with a belt pulley, of a friction pulley in frictional contact with the said belt pulley, springs pressing on the said friction pulley, in line with the driving shaft to hold the friction pulley in contact with the belt pulley, and a shifting device for moving the said friction pulley out of contact with the belt pulley, substantially as shown and described.

6. In a traction engine, the combination with a main driving shaft, a small driving pinion, and a belt pulley, both secured on the said shaft, of a friction pulley adapted to move in frictional contact with the said belt pulley, springs arranged longitudinally in the hub of the said belt pulley, and blocks pressed on by the said springs and engaging the face of the said pinion, substantially as shown and described.

7. In a traction engine, the combination with a main driving shaft, a small driving pinion and a belt pulley, both secured on the said shaft, of a friction pulley adapted to move in frictional contact with the said belt pulley, springs arranged in the hub of the said belt pulley, blocks pressed on by the said springs and engaging the face of the said pinion, and a second driving pinion mounted to slide on and to turn with the hub of the said friction pulley, substantially as shown and described.

8. In a traction engine, the combination with a main driving shaft, a small driving pinion and a belt pulley, both secured on the said shaft, of a friction pulley adapted to move in frictional contact with the said belt pulley, springs arranged in the hub of the said belt pulley, blocks pressed on by the said springs and engaging the face of the said pinion, a second driving pinion mounted to slide on and to turn with the hub of the said friction pulley, and a shifting mechanism for imparting a sliding motion to the said second driving wheel, substantially as shown and described.

9. In a traction engine, the combination with a main driving shaft, a small driving pinion and a belt pulley, both secured on the said shaft, of a friction pulley adapted to move in frictional contact with the said belt pulley, springs arranged in the hub of the said belt pulley, blocks pressed on by the said springs and engaging the face of the said pinion, a second driving pinion mounted to slide on and to turn with the hub of the said friction pulley, a shifting mechanism for imparting a sliding motion to the said second driving pinion, and means for connecting the said second driving pinion with the said friction pulley to move the latter out of frictional contact with the belt pulley at the time the shifting mechanism is actuated beyond its normal position, substantially as shown and described.

10. In a traction engine, the combination with a segmental guideway, of a bearing fitted to slide in the said guideway and carrying a gear wheel, a lever for moving the said bearing in the said guideway, and a locking mechanism for locking the said bearing in position in its guideway, substantially as shown and described.

11. In a traction engine, the combination with a bearing for a gear wheel and having recesses, of a segmental guideway in which is fitted to slide the said bearing, a bolt fitted to slide in the said guideway and adapted to engage either of the said recesses in the bearing, a lever for shifting the bearing, and a hand lever for shifting the bolt, substantially as shown and described.

12. In a traction engine, the combination with a bearing for a gear wheel and having recesses, of a segmental guideway in which is fitted to slide the said bearing, a bolt fitted to slide in the said guideway and adapted to engage either of the said recesses in the bearing, a lever for shifting the bearing, a hand lever for shifting the bolt, and a spring pressing on the said bolt to hold the latter in engagement with either of the said recesses, as set forth.

JAMES A. STOUT.

Witnesses:
J. M. HAMILL,
HENRY SPRING.